United States Patent [19]

Akiba et al.

[11] Patent Number: 4,586,040

[45] Date of Patent: Apr. 29, 1986

[54] INTERRUPTION HANDLING SYSTEM IN TIME DIVISION MULTIPLEX REMOTE CONTROL SYSTEM

[75] Inventors: Osamu Akiba, Meyagawa; Yoshiharu Suzuki, Kadoma; Motoharu Terada, Higashiosaka; Takashi Saeki, Shijonawate, all of Japan

[73] Assignee: Matsushita Electric Works, Ltd., Osaka, Japan

[21] Appl. No.: 480,590

[22] Filed: Mar. 30, 1983

[30] Foreign Application Priority Data

May 15, 1982 [JP] Japan ................................. 57/81850

[51] Int. Cl.⁴ ............................................. H04Q 9/00
[52] U.S. Cl. .......................... 340/825.08; 340/825.15; 340/505; 340/518
[58] Field of Search ....................... 340/825.07, 825.12, 340/825.13, 825.5, 518, 505, 825.06, 825.08, 825.15

[56] References Cited

U.S. PATENT DOCUMENTS

| | | | |
|---|---|---|---|
| 3,444,521 | 5/1969 | Breese | 340/825.13 |
| 4,185,272 | 1/1980 | Feiker | 340/825.07 |
| 4,400,694 | 8/1983 | Wong et al. | 340/825.12 |
| 4,532,509 | 7/1985 | Pulverenti, et al. | 340/825.15 |

*Primary Examiner*—Donald J. Yusko
*Attorney, Agent, or Firm*—Staas & Halsey

[57] ABSTRACT

A time division multiplex remote control system controls data transmission between a central controller and a plurality of addressable remote terminals coupled to the central controller through a signal line. The central controller transmits to each of terminals a transmission signal comprising address data addressing a terminal, control data, a reply signal standing-by period defining signal for defining a period for receiving a reply signal from the corresponding terminal, an interruption request signal standing-by period defining signal for defining a period for receiving an interruption request signal from the terminal. Each terminal receives the transmission signal and, when the received address data coincides with an address of the terminal, accepts the control data and sends a reply signal during a reply signal standing-by period. Each terminal further detects a change of a supervisory input which the terminal supervises and sends an interruption request signal at the timing of the interruption request signal standing-by period of the transmission signal.

8 Claims, 15 Drawing Figures

INTERRUPTION HANDLING SYSTEM IN TIME DIVISION MULTIPLEX REMOTE CONTROL SYSTEM

BACKGROUND OF THE INVENTION

1. Field of the Invention

The present invention relates to a time division multiplex remote control system and, more particularly, relates to an interruption handling system capable of rapidly handling an interruption when a supervisory input in a terminal causes a change.

2. Description of the Prior Art

FIG. 1 shows a schematic block diagram showing the whole of this type of a time division multiplex remote control system. Such a remote control system includes a central controller 1 and a plurality of terminals 2 having the respective inherent addresses connected to a signal line 3. A transmission signal including inherent address data is transmitted from the central controller 1 so that a terminal 2 corresponding to the inherent address is accessed, and the communication of data such as control data and supervisory data has been made between the central controller 1 and the accessed terminal 2. For example, in a modern building, terminals 2, 2, . . . are provided in each of several rooms, respectively, the terminals 2, 2, . . . applying control information to an object to be supervised, such as a lamp and a wall type switch in each room and also supervising a change of a supervisory input from each of the objects to be supervised. For example, assuming that the object to be supervised is a wall type switch and the switching of the lamp is made by an on/off of the wall type switch, the change from the off to the on in the wall type switch is detected as a change of a supervisory input by the terminal 2 when the wall type switch is rendered on for the purpose of lighting. The data as to the change of the supervisory input, which is supervisory data, is returned to the central controller 1, as a reply signal when the corresponding terminal 2 is accessed through polling from the central controller. The central controller 1 receives the supervisory data and then sends to the terminal 2 control data necessary for lighting a corresponding lamp. The terminal 2 accepts the control data and lights the lamp.

FIG. 2 shows an example of a format of a transmission signal used in a conventional time division multiplex remote control system. The transmission signal includes a start signal or a field of start signal ST, an address signal or an address signal region AD for transmitting address data of a terminal, a control signal or a control signal region CTR for transmitting control data, a reply signal standing-by period defining signal or a reply signal standing-by period defining signal region RW for defining a time period for receiving a reply signal from the addressed terminal. The transmission signal is in a form of bipolar signal which is pulse-width modulated.

Now, referring to FIGS. 1 and 2, an operation of the conventional time division multiplex remote control system will be briefly described. First, the central controller 1 sequentially and cyclically accesses the terminals 2. To this end, each of the terminals is sequently polled by sequentially changing the address data included in the transmission signal shown in FIG. 2. If and when the terminal 2 receives a transmission signal including address data coinciding with its own inherent address, the terminal 2 accepts the control data included in the transmission signal and outputs the control output CS to control a load associated with the terminal and also sends out to the central controller 1 supervisory data, as a reply signal, based on a supervisory input SS during the period set by a reply signal standing-by period defining signal RW.

As described in the foregoing, since, in this type of a conventional time division multiplex remote control system, each of the terminals 2 is sequentially accessed, the time necessary for accessing all of the terminals 2, 2, . . . becomes longer as the number of the terminals is increased. Accordingly, even if a change of the supervisory input SS occurs immediately after a certain terminal 2 is polled, the terminal 2 will be responsive at the time of the next polling after all of the remaining terminals are polled, which means that the rate of the response is very slow. For example, by way of an example of the above described wall type switch, non-practical situation occurs where a lamp is lighted 5 to 10 seconds later even if a switch is rendered on for the purpose of lighting the lamp. In addition, assuming that an object to be supervised is a smoke sensing apparatus, for example, even if the smoke sensing apparatus senses smoke and the terminal 2 detects the change of the supervisory input SS, the response thereto possibly becomes slower due to the order of the polling, which is, of course, not practical.

Furthermore, since all of the terminals are cyclically accessed, the frequency of accessing a single terminal 2 is necessarily decreased if the number of the terminals 2 is increased.

SUMMARY OF THE INVENTION

The present invention is directed to a time division multiplex remote control system for data transmission between a central controller and a plurality of addressable remote terminals coupled to the central controller through a signal line. The central controller includes transmission signal generating means for generating a transmission signal to be transmitted and transmitting means for transmitting the transmission signal generated by the transmission signal generating means. The transmission signal comprises terminal identifying information for identifying one of the plurality of terminals which is to receive the transmission signal to be transmitted, control information indicating a control to be made in the terminal, and a reply signal standing-by period defining signal for defining a period of time for receiving a reply signal returned from the terminal identified by the terminal identifying information. The central controller further includes receiving means for receiving a signal sent by the terminals and control information producing means responsive to the received reply signal for producing necessary control information. In addition, each of the plurality of the terminals includes store means for storing identifying information identifying the corresponding terminal, receiving means for receiving the transmission signal being transmitted from the central controller, control information accepting means responsive to the receiving means for accepting the control information included in the transmission signal when the received terminal identifying information coincides with its own identifying information stored in the storing means, reply signal transmitting means responsive to the receiving means for transmitting a reply signal in response to the reply signal standing-by period defining signal included in the received transmission signal when the received terminal identifying information coincides with the identifying information stored in the storing means, change-of-supervisory input detecting means for detecting the change of the supervisory input of an object to be controlled which the terminal supervises, interruption request signal generating means for generating an interruption request signal responsive to the change-of-supervisory input detecting output from the change-of-supervisory input detecting means, and interruption request signal transmitting means for transmitting the interruption request signal generated in the interruption request signal generating means at the timing other than the reply signal transmitting timing.

In accordance with a preferred embodiment of the present invention, the plurality of terminals are divided into a plurality of groups each including a predetermined plurality of terminals. The terminal identifying information comprises group identifying information identifying a group to which the terminal belongs and individual identifying information for identifying individually the terminal included in the group. The central controller further includes group accessing mode signal generating means responsive to the interruption request signal transmitted by the interruption request signal transmitting means in the terminal for generating a group accessing mode signal for specifying a mode accessing the terminal for each group. The transmission signal transmitting means sequentially transmits the group address as terminal identifying information. As a result, when an interruption request signal is generated, a plurality of terminals are accessed for each group, so that the particular terminal generating the interruption request signal can be rapidly accessed.

In accordance with other preferred embodiment of the present invention, the reply signal transmitting means in the terminal transmits as a reply signal individual identifying information identifying the terminal when the group identifying information received by the terminal coincides with the group identifying information stored in the store means. In addition, the transmission signal transmitting means in the central controller transmits as terminal identifying information the received individual identifying information when the controller receives the individual identifying information as a reply signal.

In accordance with a further preferred embodiment of the present invention, the transmission signal from the transmission signal transmitting means in the central controller comprises an interruption request signal standing-by period defining signal for defining an interruption request signal standing-by period for receiving the interruption request signal. The interruption request signal transmitting means transmits the interruption request signal during the standing-by period in response to the interruption request signal standing-by period defining signal from the transmission signal transmitting means.

In accordance with a still further preferred embodiment of the present invention, the interruption request signal standing-by period defining signal is divided into a plurality of subperiods corresponding to the plurality of groups of the terminals. The interruption request signal is sent out during the subperiod corresponding to the group identifying information for the group which to the terminal having generated the interruption request signal belongs to. As a result, the group to which the terminal having generated the interruption request signal belongs can be easily identified.

In accordance with a still further preferred embodiment of the present invention, the individual identifying information sent out as the reply signal is coded information of a plurality of bits wherein a signal of a single bit is represented by a combination of one pulse having a longer pulse width and the other pulse having a shorter pulse width or a combination of one pulse having a shorter pulse width and the other pulse having a longer pulse width. The central controller detects a combination of two pulses having a longer pulse width in each bit of the individual identifying information returned as the reply signal and hence can detect that there exists in a single group more than two terminals which have been sending out an interruption request signal. Furthermore, if and when such combination of two pulses having a longer pulse width is detected, possible addresses are evaluated based on the bit position or positions where such combination or combinations are detected, so that only the terminals corresponding to the possible addresses can be polled.

Accordingly, a principal object of the present invention is to provide a time division multiplex remote control system capable of returning to a central controller an interruption request signal during the period other than a usual reply signal returning period in response to the change of a supervisory input in a terminal.

Other object of the present invention is to provide a time division multiplex remote control system adapted such that when an interruption request signal is generated, an access from a central controller to terminals is made for each of a predetermined plurality of groups.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 4 shows one example of a format of signals used in the time division multiplex remote control system of the present invention, wherein FIG. 4(a) shows an example of a transmission signal and FIG. 4(b) shows a signal returned from a terminal;

DESCRIPTION OF THE PREFERRED EMBODIMENTS

Figure 1:
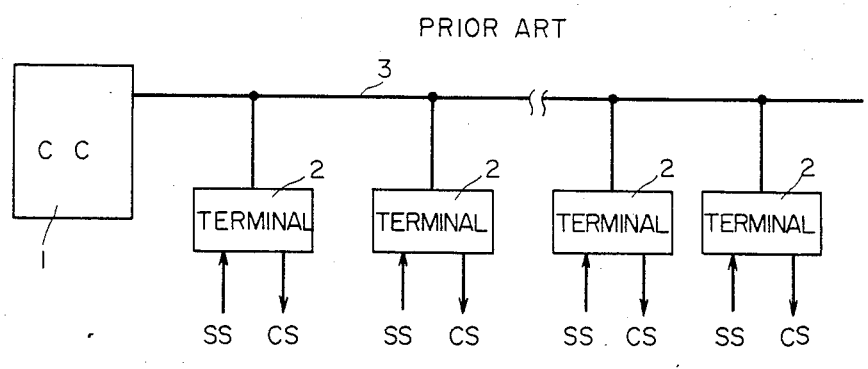
FIG. 1 is a schematic diagram showing a conventional time division multiplex remote control system.
Figure 3:
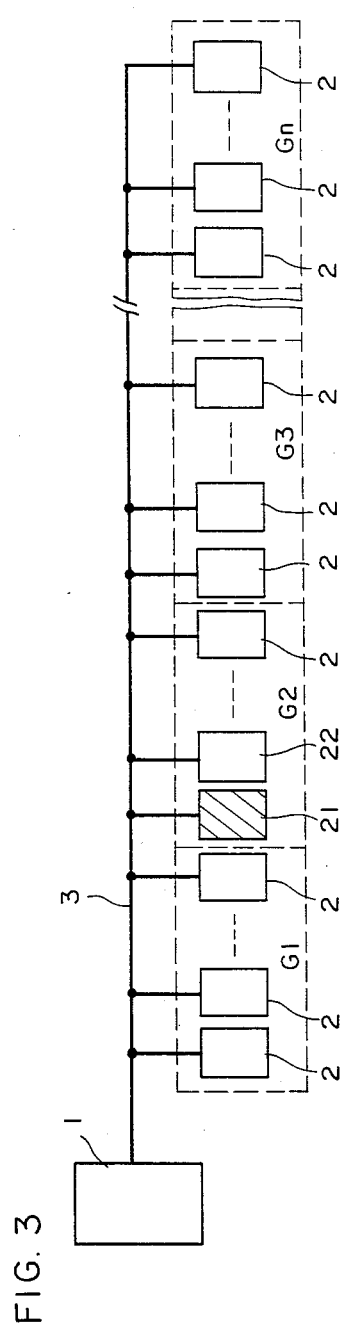
FIG. 3 is a schematic diagram showing a time division multiplex remote control system of the present invention.

FIG. 3 is a block diagram showing a schematic structure of a time division multiplex remote control system of the present invention. As the same as a conventional system, a plurality of terminals 2 are connected to a central controller 1 through a signal line 3. As far as this connection is concerned, it is the same as that in FIG. 1. However, according to the present invention, the plurality of terminals are divided into a plurality of groups G1, G2, G3, . . . , Gn. For example, assuming that there are 256 terminals in the system, these terminals are divided into 16 groups, each group including 16 terminals. Eight bits are used for specifying identifying information, that is, an address of a terminal. Of these 8 bits, the four most significant bits are used for identifying the group and the four least significant bits are used for individually identifying a terminal in a particular group. For example, the four most significant bits of addresses of 16 terminals included in the first group G1 are all "0000". On the other hand, regarding the remaining the four least significant bits, "0000" to "1111" are assigned to the respective the four least significant bits, respectively, for each of 16 terminals included in the group. For example, the address of the first terminal included in the first group G1 is represented by "00000000", the second terminal is represented by "0000001", the third terminal "0000010" and so on. In the second group, "0001" is assigned to all of the four most significant bits for all of the 16 terminals included in the second group and, to the four least significant bits, "0000" to "1111" are assigned, respectively just as the first group. Thus, each of the terminals has a particular address so that each of the terminals can be individually identified and also can be identified for each group.

Figure 2:
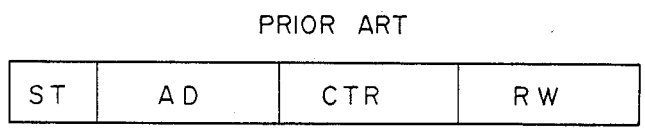
FIG. 2 is a drawing for explaining a format of a transmission signal used in the system shown in FIG. 1.
Figure 4:
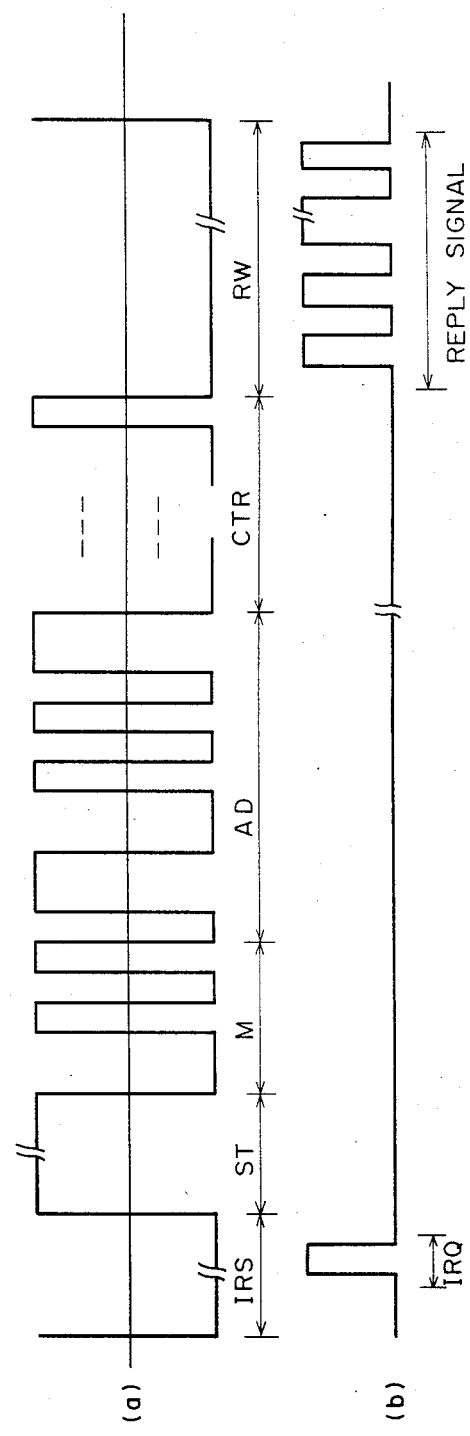

FIG. 4(a) shows an example of a format of a transmission signal transmitted from a central controller used in a time division multiplex remote control system of the present invention. The format of the transmission signal is different from the conventional transmission format shown in FIG. 2 in the following respects. More particularly, an interruption request signal standing-by period defining signal IRS for defining a period of time for accepting an interruption request signal IRQ (FIG. 4(b)) is provided prior to a start signal ST, and a mode designating signal M is also provided between the start signal ST and an address signal AD, the mode designating signal M designating either of an individual accessing mode for individually accessing each of the terminals in accessing the terminals and the group accessing mode for accessing each of groups of terminals when an interruption is requested. More specifically, a field for a mode designation comprises four bits and hence an ACK mode can be also defined other than the above described two modes. The ACK mode will be described with reference to FIG. 10. As shown in FIG. 4, a transmission signal format used in the present embodiment comprises an interruption request signal standing-by period defining signal IRS, a start signal ST, a mode designating signal M, an address signal AD, control data CTR and a reply signal standing-by period defining signal RW. The central controller 1 transmits such a transmission signal. Meanwhile, although, in the embodiment of FIG. 4, a interruption request standing-by period defining signal IRS for defining an interruption request signal standing-by period is specifically provided, it will be clear through the subsequent description that, basically, such an interruption request signal standing-by period is not necessary if an interruption request signal is adapted to be received during the period other than the reply signal standing-by period.

Prior to the detailed description of the present invention, a brief operation will be described with reference to FIGS. 3 and 4 for the purpose of grasping the basic concept of the present invention. Usually, the central controller 1 individually and sequentially accesses each of the terminals 2, just as the same as the conventional time division multiplex remote control system. Now, it is assumed that when a particular terminal 22 included in the second group G2 is being polled, another terminal 21 included in the same second group sends out an interruption request signal IRQ to the central controller 1. Since the interruption request signal IRQ from the terminal 21 is sent out during an interruption request signal standing-by period in the embodiment of FIG. 4, the central controller 1 can receive the interruption request signal IRQ immediately. Thereafter, in the central controller 1, the mode designating signal M in the transmission signal format is set to designate a group accessing mode. As a result, after the interruption request is received by the central processor 1, addressing of the terminals is made for each group, in the order of the first group G1, the second group G2, the third group G3, . . . In the access of the second group, the central controller 1 detects that any terminal or terminals included in the second group are sending out an interruption request signal since the terminal 21 included in the second group is sending out a interruption request signal. Thereafter, in the central controller 1, the mode designating signal M is set to designate an individual accessing mode again and then the terminal 21 included in the second group is accessed in an individual accessing mode. As a result, it is specified that a particular terminal 21 is sending out an interruption request signal and hence necessary control information is sent out to the terminal 21.

With the above described basic concept in mind, a more detailed description of the present embodiments of the present invention will be described.

Figure 5:
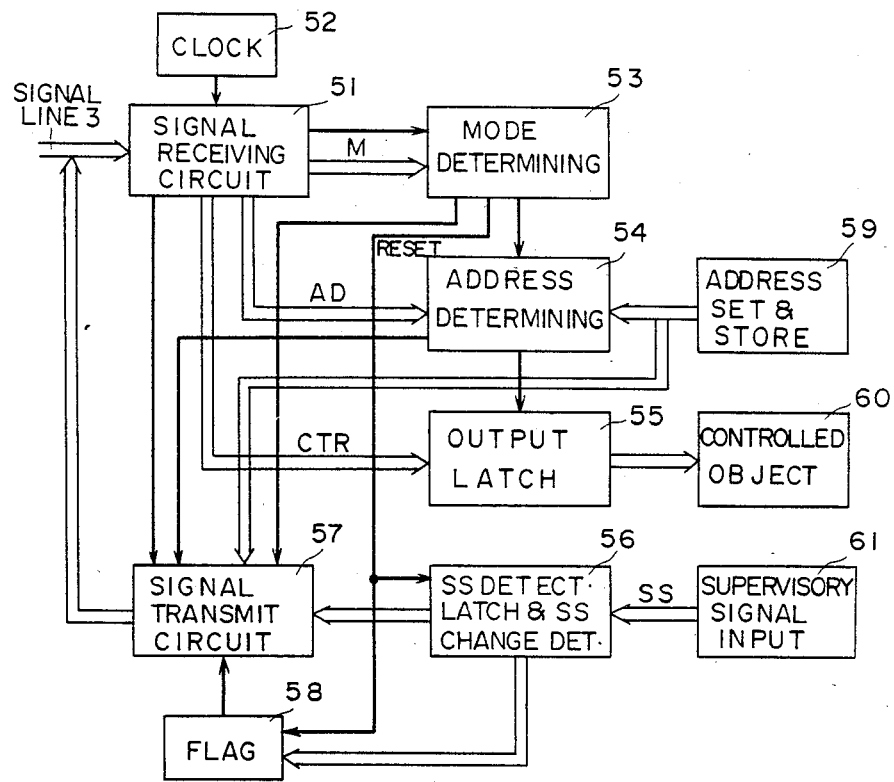
FIG. 5 is a block diagram showing a structure of a terminal shown in FIG. 3.

FIG. 5 is a schematic block diagram showing a structure of a terminal 2 in FIG. 3. The terminal includes a transmission signal receiving circuit 51 for receiving a transmission signal transmitted from the central controller 1 through a signal line 3. The signal receiving circuit 51 receives a serial transmission signal in a format shown in FIG. 4 to make a series-parallel conversion of the received transmission signal so that a mode signal M, an address signal AD, a control signal CTR and a timing signal which is produced based on the start signal ST, the interruption request signal standing-by period defining signal IRS and the reply signal standing-by period defining signal RW are withdrawn. The mode signal M from the signal receiving circuit 51 is applied to a mode determining circuit 53. The mode determining circuit 53 is responsive to the mode signal M for applying an address determination enabling signal for enabling determination of address in an address determinating circuit 54. For example, assuming that the mode signal M is a signal for designating an individual accessing mode, the corresponding address determination enabling signal enables an address determination or comparison of the received address signal inputted to the address determination circuit 54 and address information stored in an address setting and storing means 59 which is described subsequently, and assuming that the mode signal M is a signal for determining a group accessing mode, the enabling signal enables the determination or comparison of the address portion in the received address signal identifying a group, for example, the four most significant bits of the address and the address portion in the address information stored in the storing means 59, for example, the four most significant bits. The address determining circuit 54 is a comparator circuit, for example, which compares an address signal outputted from the signal receiving circuit 51 with address information from the address setting switch or address setting and storing means 59 on a bit by bit basis. As described in the foregoing, in case of an individual accessing mode, all of the bits in the address information are compared and in case of a group accessing mode, all of only the address portion identifying a group are compared. The address setting switch or address store 59 applies all of the bits of an address stored therein to the address determining circuit 54 and also applies to a signal-to-be-replied output circuit 57 only an address portion of the least significant bits for determining an individual address of the terminal, for example, information of the four least significant bits. If and when all of the bits compared are coincide with each other, that is, when the received address by the terminal coincides with the address stored 59 included in the terminal in an individual accessing mode, the address determining circuit 54 applies a coincidence output to an output latch circuit 55. If and when a result of comparison is a coincidence in a group accessing mode, that is, the four most significant bits coincide with each other, a coincidence output is applied to the signal-to-be-replied outputting or transmit circuit 57.

The control signal CTR from the signal receiving circuit 51 is coupled to the output latch circuit 55. The output latch circuit 55 latches the control signal CTR from the signal receiving circuit 51 in response to a coincidence output from the address determining circuit 54 so that the circuit 55 supplies the control signal to a load 60 such as a lamp.

In addition, the terminal includes a supervisory input detecting and latch and change-of-supervisory input detecting circuit 56 which detects a supervisory input SS from a supervisory input circuit 61 such as a wall type switch and the like to latch supervisory input data and detects the change of the supervisory input. The signal-to-be-replied output circuit 57 is responsive to a determination output from the mode determining circuit 53 and a timing signal from the signal receiving circuit 51 (the timing signal is generated in response to a reply signal standing-by-period defining signal included in a transmission signal received) for returning as a reply output the supervisory input data latched in the latch circuit 56 through the signal line 3 to the central controller 1. When in the group accessing mode, the address information of the four least significant bit stored in the store 59 is sent out as a reply signal to the central controller 1 through the signal line 3 from the output circuit 57, in response to the timing signal from the above described signal receiving circuit 51, coincidence output of the four most significant bits from the address determining circuit 54 and a set output from a subsequently described interruption flag 58.

Furthermore, when the supervisory input SS from the supervisory input circuit 61 changes, the supervisory input detecting and latch and change-of-supervisory input detecting circuit 56 detects the supervisory input data and latches the same and also applies a detection output for the change of the supervisory input to the interruption flag 58. The interruption flag 58 is set in response to the detection output of the change of the supervisory input from the circuit 56. The set output from the interruption flag 58 is sent out to the central controller 1 from the signal-to-be-replied output circuit 57 through a signal line in response to a timing signal from the signal receiving circuit 51 (the timing signal is generated in synchronization with the interruption request signal standing-by period defining signal included in a transmission signal). As a result, the interruption request signal IRQ is sent to the central controller 1 during the interruption request signal receiving period in the controller 1.

Meanwhile, the mode determining circuit 53 generates a reset signal for resetting the interruption flag 58 and the circuit 56 when the circuit 53 determines an ACK mode.

Figure 6:
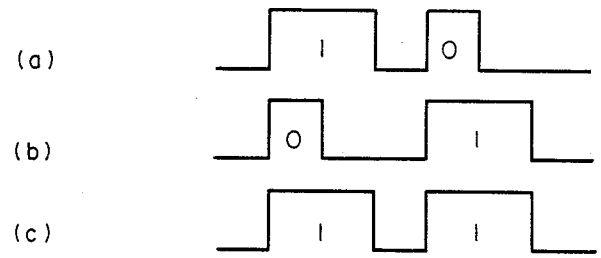
FIG. 6 is a waveform showing an example of a reply signal from a terminal.

As described in the foregoing, although all of the terminals included in a particular group accessed in a group accessing mode are accessed at the same time, only the terminal or terminals 2 having outputted an interruption request signal IRQ, that is, the terminal or terminals 2 in which the interruption flag 58 included therein is set, send out as a reply signal the four least significant bits of its own address stored in the store to the central controller 1 during the period receiving a reply signal standing-by period defining signal RW. One example of sending the data of the four least significant bits will be described in the following. For example, the logical data of each of the four least significant bits in the address is formed as a coded signal of 2 bits. For example, if the logical value is "1", the corresponding code signal is "10" and if the logical value is "0" then the code signal is "01". Accordingly, the address data represented by 4 bits of the four least significant bits which is "0000" is formed as a reply signal RS of 8 bits of "01" "01" "01" "01". Similarly, the address data of the four least significant bits which is "1100" is formed as a reply signal of 8 bits of "10" "10" "01" "01". In this case, the logical value "1" in a reply signal RS is represented by a pulse having a longer pulse width and the logical value "0" in a reply signal RS is represented by a pulse having a shorter pulse width. Therefore, if a value in a predetermined bit of the four least significant bits in the address data is "1", the reply signal RS corresponding thereto is a signal of 2 bits of "10" as shown in FIG. 6(a). On the other hand, the value in a predetermined bit in the address data is "0", the reply signal RS corresponding thereto becomes a signal of 2 bits of "01" as shown in FIG. 6(b). Accordingly, if and when these signals are sent out simultaneously, the reply signal RS corresponding to the above described predetermined bits, sent out to the signal line 3 becomes a signal of "11" as shown in FIG. 6(c). Since the code signal of "11" does not indicate the logical values "1" and "0", the central controller 1 can determine or detect that the reply signals are sent out from more than two terminals 2 included in a group by detecting such code signal.

Figure 7:
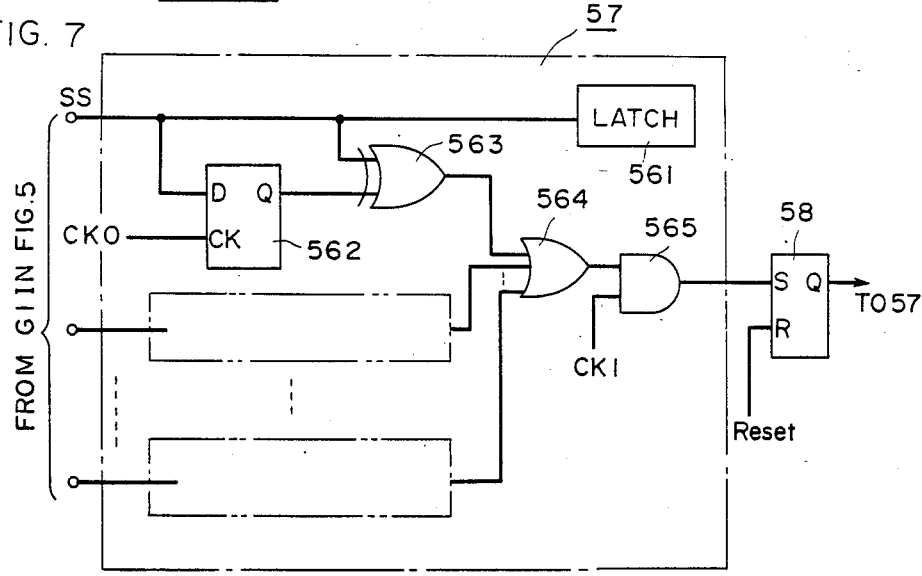
FIG. 7 shows a more detailed circuit diagram of a change-of-supervisory input detecting circuit shown in FIG. 5.

FIG. 7 is a circuit showing in detail a supervisory input detecting and latch and change-of-supervisory input detecting circuit 56 shown in FIG. 5. The circuit 56 includes a latch circuit 561 receiving a supervisory input from a supervisory input circuit 61 and latching the state of the supervisory input. The supervisory input is connected to a D input terminal of a D type flip-flop 562 and also is applied to one input of an EXCLUSIVE OR gate 563. A sampling clock CKO is connected to a clock terminal of the D type flip-flop 562. A Q output of the D type flip-flop 562 is connected to the other input of the EXCLUSIVE OR gate 563. Thus, a change of a supervisory input is detected. If the supervisory input signal changes, the EXCLUSIVE OR gate 563 outputs a logical "1" signal response to the Q output from the D type flip-flop 562 and the supervisory input signal SS. The "1" output from the gate 563 is applied to one input of an AND gate 565 through an OR gate 564. A sampling clock CK1 is supplied to the other input of the AND gate 565. An output from the AND gate 565 is applied as a detecting output of the change of supervisory input to a set input terminal of an RS flip-flop constituting the interruption flag 58. Correspondingly, an interruption flag set signal is withdrawn from the Q output in the interruption flag 58. Although only one supervisory input was described, it can be easily understood that other supervisory inputs can also be detected in the same manner as described in the foregoing. Such detected outputs are applied to the AND gate 565 through the OR 564 to set the RS flip-flop 58 at the timing of the sampling clock signal CK1.

Figure 8:
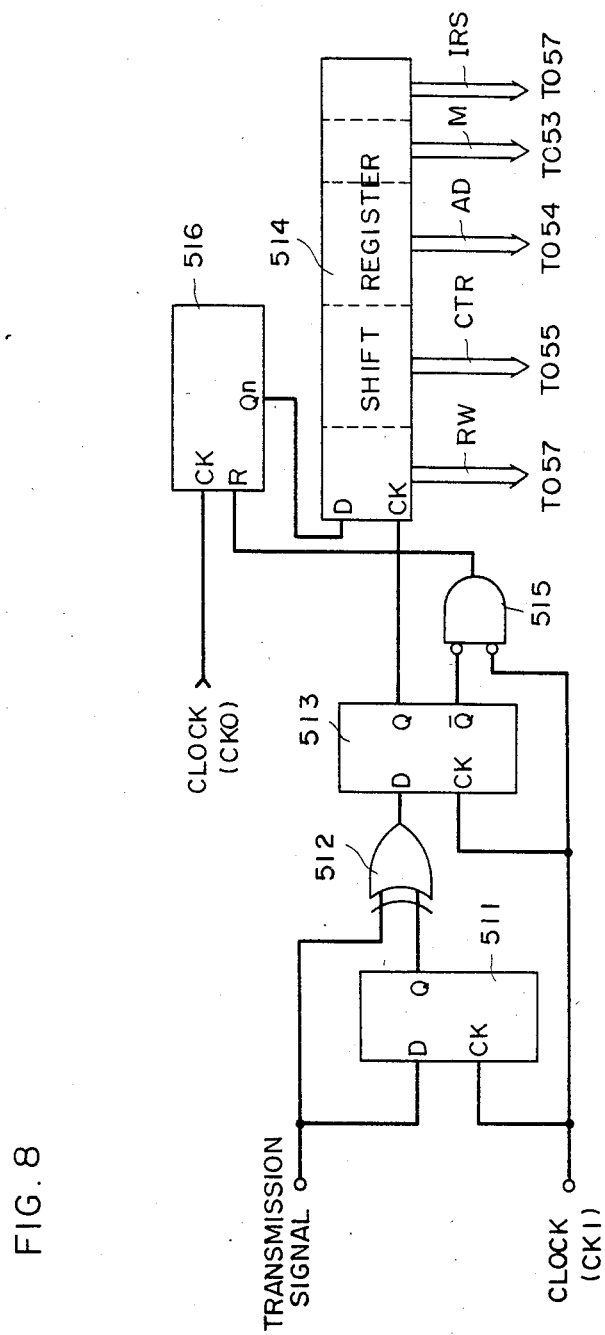
FIG. 8 shows a detailed circuit of a signal receiving portion shown in FIG. 5.

FIG. 8 is a block diagram showing the details of the signal receiving circuit 51 in FIG. 5. A transmission signal transmitted through a signal line is applied to a D input terminal of a D type flip-flop 511 and also applied to one input of an EXCLUSIVE OR gate 512. A clock signal CK1 is applied to an clock input terminal of the D type flip-flop 511. A Q output of the flip-flop 511 is connected to the other input of the EXCLUSIVE OR gate 512. As a result, the change of the transmission signal is detected just as the same as the structure of the D type flip-flop 562 and the EXCLUSIVE OR gate 563 in FIG. 7. If the change of the transmission signal is detected, the "1" outputted from the EXCLUSIVE OR gate 512 is applied to a D terminal of the second D type flip-flop 513. A clock terminal CK of the D type flip-flop 513 is coupled to the clock CK1. The Q terminal of the flip-flop 513 is connected to a CK terminal of a shift register 514, the $\overline{Q}$ terminal thereof being connected to an inverted input of an AND gate 515. The other inverted input of the AND gate 515 is coupled to the clock CK1. An output from the AND gate 515 is connected to a reset input of the counter 516. A clock CK0 from a clock source 52 is applied to a count input of the counter 516. If a value counted by the counter 516 exceeds a predetermined threshold value, the "1" output is supplied to the shift register 514 from the Qn terminal of the counter 516. In the above described structure, the change of each of pulse signals constituting a transmission signal is detected by the first D type flip-flop 511 and the EXCLUSIVE OR gate 512. The detected signal is applied to a clock terminal of the shift register 514 through the second D type flip-flop 513. While a next detected signal is being applied after the counter 516 is reset by the previously detected signal, the counter 516 counts the number of clocks CK0 supplied, and if the counted value thereof already exceeded a predetermined value of counts, the "1" is applied to the shift register 514 from the Qn terminal of the counter 516, so that the shift register 514 stores the current transmission signal as "1". If and when the value counted by the counter 516 is less than the predetermined threshold value, "0" is applied to the shift register 514, so that the shift register 514 stores a corresponding portion of a current transmission signal as "0". The counter 516 is reset by the output from the AND gate 515 simultaneously with storing in the shift register 514, so that measure of a pulse width of a next signal is prepared. Thus, a serial transmission signal in such a format as shown in FIG. 4 is sequentially shifted and stored in the shift register 514, so that series parallel conversion of the transmission signal is made.

Figure 9:
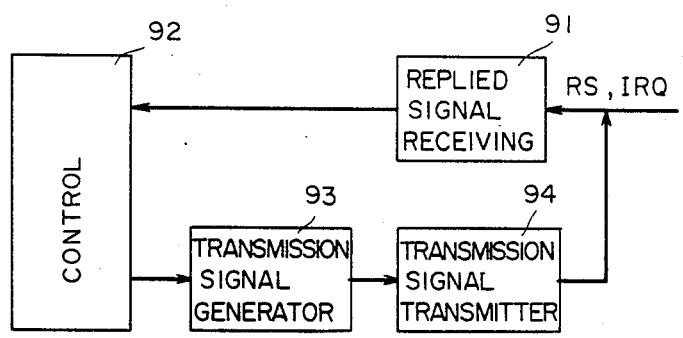
FIG. 9 is a schematic block diagram showing a central controller.

FIG. 9 is a schematic block diagram showing a structure of a central controller 1. A reply signal RS or an interruption request signal IRQ reply from a terminal is received in a replied signal receiving circuit 91 and then applied to a control 92. The control 92 is structured by a microprocessor or a microcomputer, for example. A transmission signal generating circuit 93 generates a transmission signal in response to a control signal from the control 92. The transmission signal generated is transmitted to each of the terminals through a signal line 3 by a transmission signal transmitting circuit 94.

Figure 10:
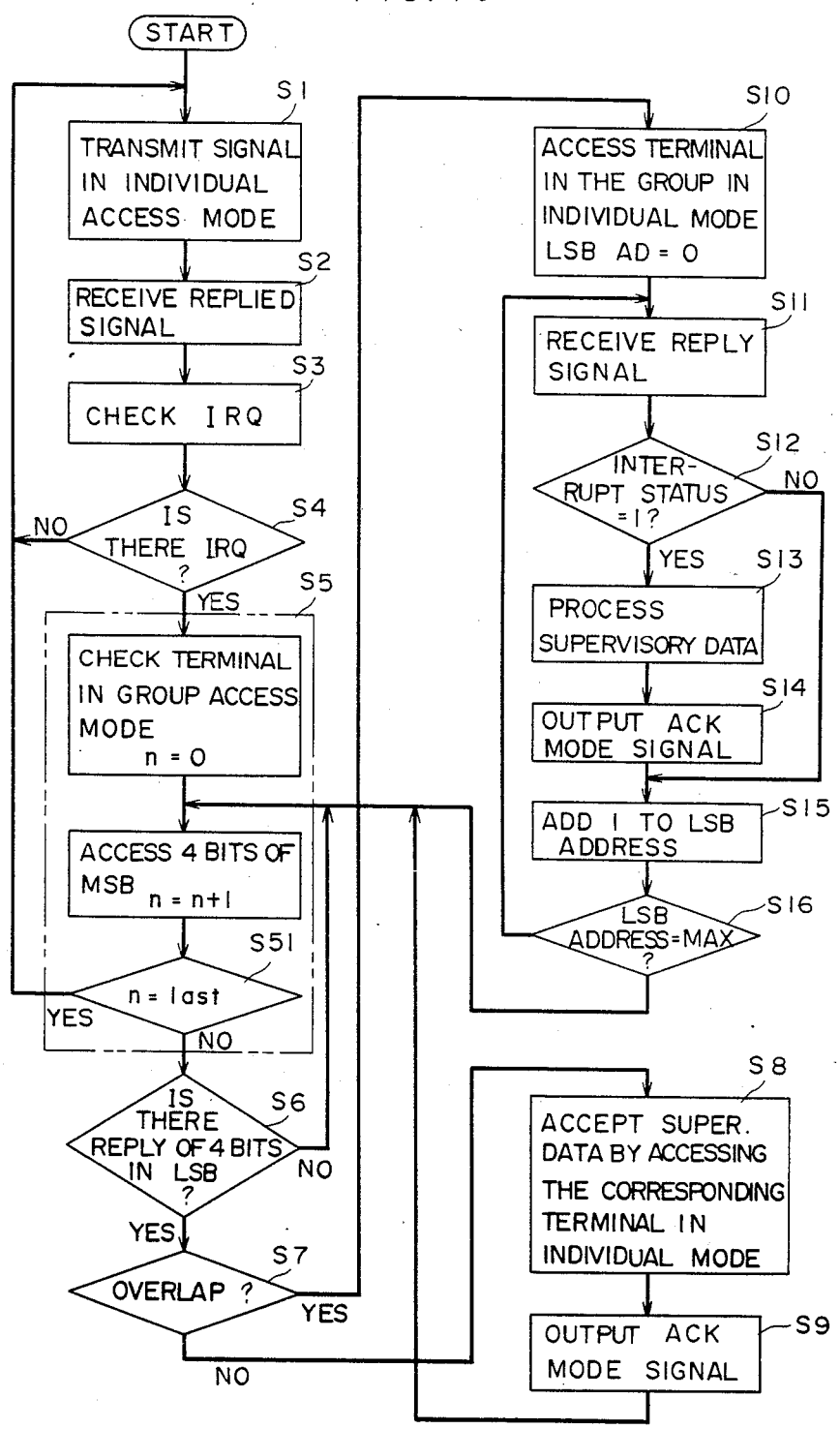
FIG. 10 is a flow chart showing an operation performed in a central controller.
Figure 11:
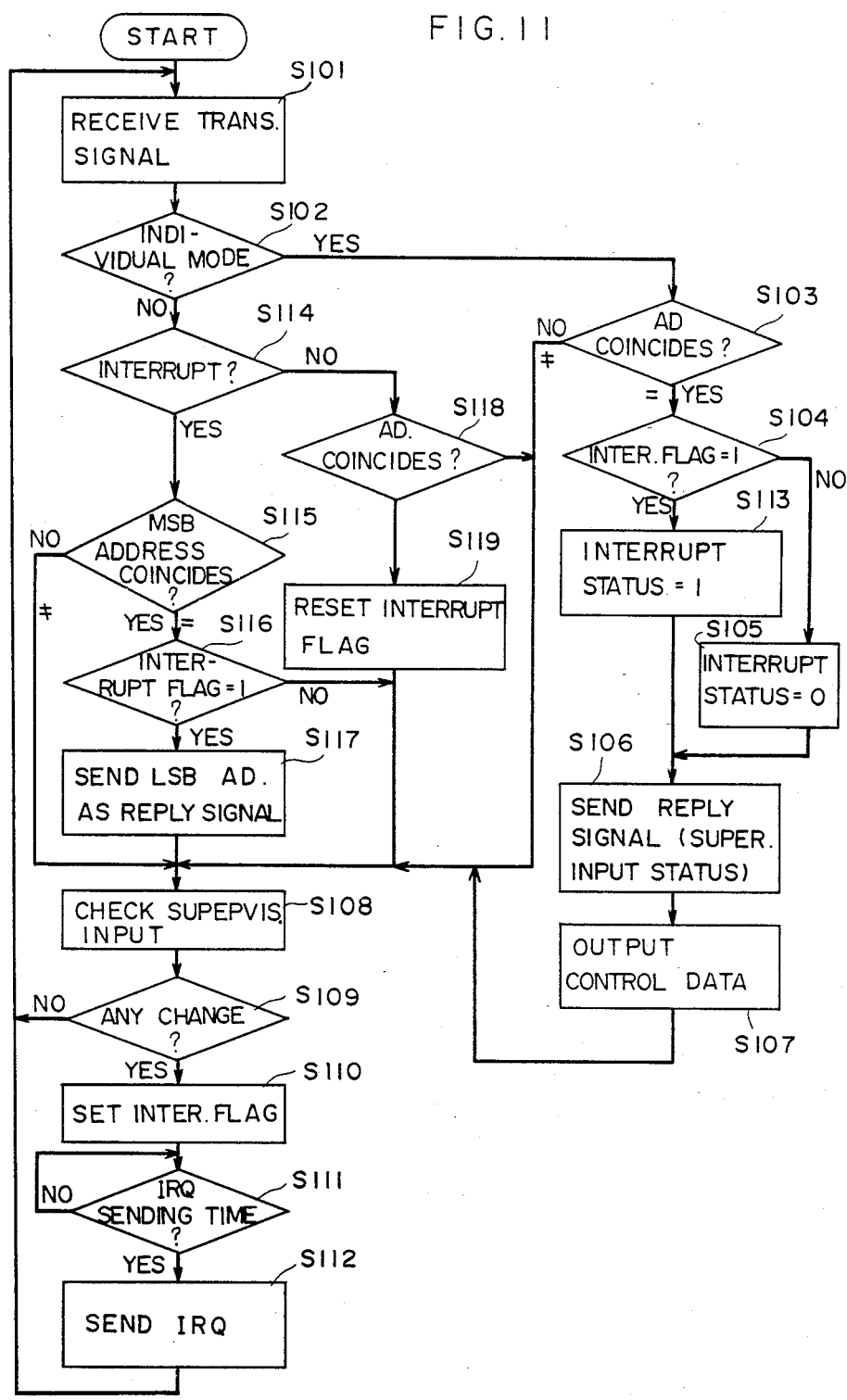
FIG. 11 is a flow chart showing an operation performed in a terminal.

FIG. 10 is a flow chart for explaining an operation of a central controller 1 and FIG. 11 is a flow chart for explaining an operation of a terminal 2. Referring to FIGS. 10 and 11, an operation of the present embodiment in accordance with the present invention will be described.

(1) First, the usual operation is assumed. More particularly, it is assumed that each of the terminals is polled by a central controller and no particular change of a supervisory input occurs.

Once an operation starts, in the central controller 1, a mode signal M (FIG. 4) is set to an individual accessing mode and an address corresponding to the first terminal of all of the terminals or an address corresponding to the first terminal of the terminals in a predetermined order is set as an address signal and also a control signal corresponding thereto is set. Similarly, in the step S1, a transmission signal including a start signal, an interruption request signal standing-by period defining signal and a reply signal standing-by period defining signal as shown in FIG. 4 is produced and transmitted. On the other hand, on the terminal side, in FIG. 11, after a transmission signal is received in the step S101, it is determined in the step 102 whether a mode designating signal in the received transmission signal designates an individual accessing mode or not. In this case, the mode is an individual accessing mode and thus the program proceeds to the step 103 wherein an address included in the received transmission signal is compared with an address of the terminal which just received the transmission signal. If and when both addresses coincide with each other, the program proceeds to the step 104 wherein it is determined whether an interruption flag is set. In the state we now assume, the interruption flag has not yet been set and thus in the next step S105, an interruption status bit included in a reply signal (the reply signal is usually structured by bits indicating supervisory data plus a status bit indicating an interruption status and a parity bit indicating a parity) is set to zero. Thereafter, in the step S106, a reply signal comprising a supervisory input and interruption status information is sent out. Thereafter, the program proceeds to the step S107 wherein the control data included in the received transmission signal is accepted and is outputted to the object to be supervised. Then, a supervisory input is checked in the step S108 and it is determined whether there is a change of a supervisory input in the step S109. In the situation we now assume, there is no change of supervisory input and hence the sequence returned to the start and the steps already described are repeated.

If the address included in the transmission signal received by the terminal does not coincide with the actual address stored in the terminal, the program returned to the start through the steps S103 to S108 and S109.

(2) Now it is assumed that a change of a supervisory input is detected when a terminal is polled in an individual accessing mode.

In this case, in the step S108, the change of the supervisory input is detected and in the step S109, it is determined that change of supervisory input occurs. Accordingly, the program proceeds to the step S110 wherein an interruption flag is set. Thereafter, in the step S111, it is determined whether it is a timing when an interruption request signal IRQ is to be sent out. More particularly, it is determined whether now is an interruption request signal standing-by period in the transmission signal. If and when such timing comes, the program proceeds to the step 112 wherein the interruption request signal IRQ is sent out through a signal-to-be-replied outputting circuit.

The interruption request signal IRQ sent out from the terminal is received in the central controller. Again referring to FIG. 10, the interruption request signal sent from the terminal is detected in the step S3 and thereafter, in the step S4, it is determined whether there is an interruption request signal IRQ. Since an interruption request signal IRQ has already been received, the program proceeds to the step S5 wherein each of groups of terminals is accessed for each group in the group accessing mode. For example, in the case where there are 16 groups, each group including 16 terminals, a transmission signal is transmitted to each group from the address "0000" to "1111" in the four most significant bits. In the step S6, it is determined whether address data of the four least significant bits is returned from a group for each polling of each group. If and when there is no reply, the program returns to the step S5 wherein an address in the four most significant bits is incremented by 1. In such a way, all of 16 groups are accessed. In the case where an address data of the four least significant bits is replied when a certain group is polled, the program proceeds from the step S6 to the step S7 wherein it is determined whether there is a particular combination (referred to as overlap in the flow chart) shown in FIG. 6(c) in the address data of 4 bits being replied. If and when there is no such particular combination, which means that only one interruption request signal IRQ is transmitted from only one terminal included in the group in question, the terminal is accessed in an individual accessing mode based on only the address information replied from the terminal and then, the supervisory data transmitted from the terminal is accepted in the central controller. Thereafter, in the step S9, the mode signal M in the transmission signal is set to an ACK mode signal and is transmitted to the terminal. Thereafter, the program returns to the step S5 and the subsequent group of terminals is accessed. If and when all of the group accesses are terminated, the program returns from the step S5 to the start.

If and when the address data of the four least significant bits is replied and there is a particular combination as shown in FIG. 6(c) in the replied data, the program proceeds from the step S7 to the step S10. Thereafter, all of the terminals included in the group which replies the address data of the four least significant bits are sequentially polled in an individual accessing mode. More particularly, in the step S10, the transmission signal is sent out in an individual accessing mode, starting from "0" of the least significant address indicating an individual identifying address in the group.

In an operation of a terminal in an individual accessing mode, the program proceeds to the steps S102 and S103 in FIG. 11 and, if both addresses coincide with each other, the program further proceeds to the step S104. In the step S104, it is determined whether an interruption flag is set. Since an interruption flag has been already set in the step S110, the program proceeds to the step S113 wherein an interruption status bit is set to 1. Thereafter, in the step S106, a reply signal is sent out and in the step S107, the control data is accepted. In this case, in the central controller 1, the supervisory data replied in the step S11 in FIG. 10 is accepted and in the step S12, it is determined whether the interruption status is set. As described in the foregoing, since the interruption status bit was already set to 1 in the step S113, the program proceeds to the step S13 wherein a necessary control data is produced based on the accepted supervisory data. Thereafter, in the step S14, the mode signal M is set to an ACK mode and is transmitted to the terminal. Thereafter, in the steps S15 and S16, the address defined by the least significant bits of terminals included in the group is incremented so that all of the terminals included in the group are sequentially polled. After the final terminal included in the group is polled, the sequence returns to the step S5 and a polling for a subsequent group continues.

An operation of the terminal when the terminals receive a transmission signal in a group accessing mode in the step S5 will be described with reference to FIG. 11. After a transmission signal is received in a group accessing mode in the step S101, it is determined that the mode is not an individual accessing mode in the step S102 and thus the program proceeds to the step S114. In the step S114, it is determined whether the mode is an ACK mode or a group accessing mode. In this particular case, the mode is a group accessing mode and hence the program proceeds to the step S115 wherein both addresses in the four most significant bits are compared with each other. If both addresses coincide with each other, it is determined whether the interruption flag is set in the step S116. Since the interruption flag has been already set in the step S110 for the purpose of sending out an interruption request signal IRQ, the program proceeds to the step S117. In the step S117, the information of the four least significant address of the terminal is sent out as a reply signal.

Furthermore, as described in the steps S7 and S8 of FIG. 10, in case where a particular group is identified in such a group accessing mode and the corresponding address data of the four least significant bits is replied without any particular combination shown in FIG. 6(c), the terminal replying the address information in the four least significant bits is accessed in an individual accessing mode. Now we will describe such an operation of the terminal at that time in the following with reference to FIG. 11. In this case, since the mode is an individual accessing mode, the program proceeds from the step S102 to the step S103. Then, if both addresses coincide with each other, the program proceeds from the step S103 to the step S104 wherein it is determined whether the interruption flag is set. Since the interruption flag has been already set, the program proceeds to the step S113 wherein the interruption status bit included in the reply signal is set to 1 and thereafter, in the step S106, the reply is sent out and in the step S107 the control data is accepted. Based on the reply signal sent out in the step S106, the supervisory data is accepted in the step S8 in FIG. 10. Then, since the mode signal is set to an ACK mode and the transmission signal including the same is sent out, the program proceeds to the step S118 through the steps S101, S102 and S114 on the side of terminals receiving the transmission signal. In the step S118, the address is checked. Since the address remains the same although the mode signal is set to be an ACK in the step S9, a result of address comparison is a coincidence. Accordingly, the program proceeds to the step S119 wherein the set interruption flag is reset. Thus, after the interruption flag is set and interruption request signal is sent out, necessary data communication between the terminal and the central controller is made and then the interruption flag is immediately reset, so that the central controller can wait a next interruption request.

Figure 12A:
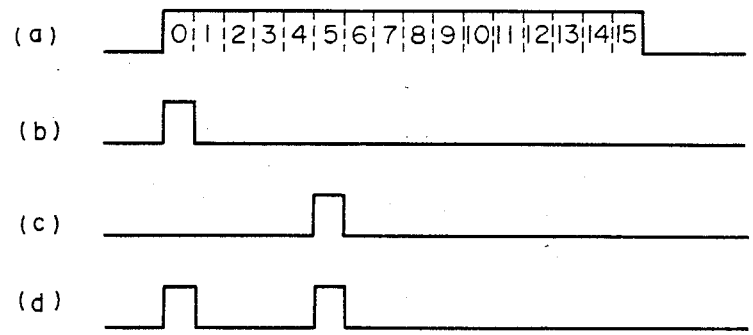
FIG. 12A is a waveform for explaining a manner of returning an interruption request signal.

In the above described embodiment, an interruption request signal IRQ may be withdrawn at any time point in a time period designated by an interruption request signal standing-by period defining signal in a transmission signal. In this respect, in a further preferred embodiment, such an interruption request signal standing-by period is equally divided into a plurality of subperiod corresponding to the number of groups of terminals and an interruption request signal to be sent from each of the groups is adapted to be withdrawn at the timing of a predetermined subperiod corresponding to the group, so that the central controller can easily specify the group sending an interruption request signal based on the timing when the interruption request signal is transmitted. FIG. 12A is a waveform showing a timing relation in the case where an interruption request signal standing-by period is equally divided into 16 subperiods. In FIG. 12A, (a) indicates a interruption request signal standing-by period defined by a transmission signal, the standing-by period being equally divided into 16 subperiods corresponding to 16 groups of terminals. Each subperiod corresponds to the address information determined by the four most significant bits of a terminal identifying address, that is, an address identifying a group. For example (as shown in (b)), in the case where an interruption request signal is transmitted from the first group, the four most significant bits of which address is "0000", the interruption request signal is sent out at the timing of the subperiod 0, and as shown in (c), if an interruption request signal is transmitted from the sixth group, the four most significant bits of which address is "0101", the interruption request signal is sent out at the timing of the subperiod 5. If there are interruption requests from the terminals included in the groups determined by the above described address 0 and the address 5, pulses appear at the subperiods 0 and 5 and hence a reply signal shown in FIG. 12A(d) is sent out. In order to send out such interruption request signal, a signal-to-be-replied output circuit 57 further comprises a circuit shown in FIG. 12B. An interruption request signal standing-by period defining signal (shown in FIG. 12C(a)) from the signal receiving circuit 51 in FIG. 5 is coupled to one input of an AND gate 570. Clock signals CK2 as shown in FIG. 12C(b), having a repetition rate which is predetermined such that one clock is included in one subperiod in the IRS, are applied to the other input of the AND gate 570. An output of the AND gate 570 is applied to a clock terminal of a counter 571. Thus, the counter 571 counts 16 pulses, for example, during the period of IRS. A clock pulse CK3 as shown in FIG. 12C(c) is applied to a reset terminal of the counter 571. The output from the counter 571 is applied to a comparator 572. Group identifying address which is determined by the four most significant bits from the store 59 in FIG. 5 is applied to the other input of the comparator 572. An coincident output from the comparator 572 is coupled to one input of an AND gate 573. An interruption flag set output from the interruption flag 58 is applied to the other input of the AND gate 573. In such a structure shown in FIG. 12B, if and when there is an interruption request from a particular terminal, a corresponding interruption request signal IRQ is sent out at a subperiod corresponding to a group including the terminal within an interruption request signal standing-by period.

Figure 12B:
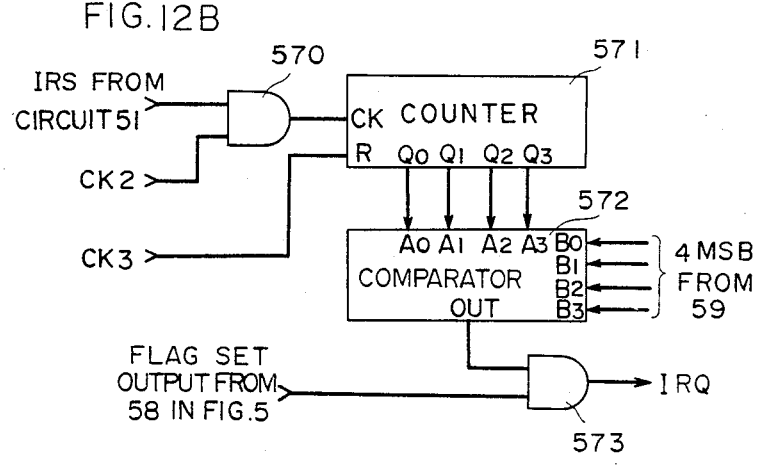
FIG. 12B shows an example of a circuit implementing the manner of returning shown in FIG. 12A.
Figure 12C:
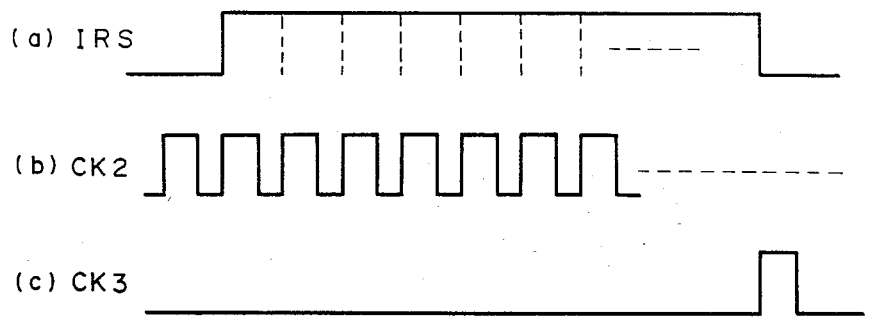
FIG. 12C is a waveform for explaining an operation of the circuit shown in FIG. 12A.
Figure 13:
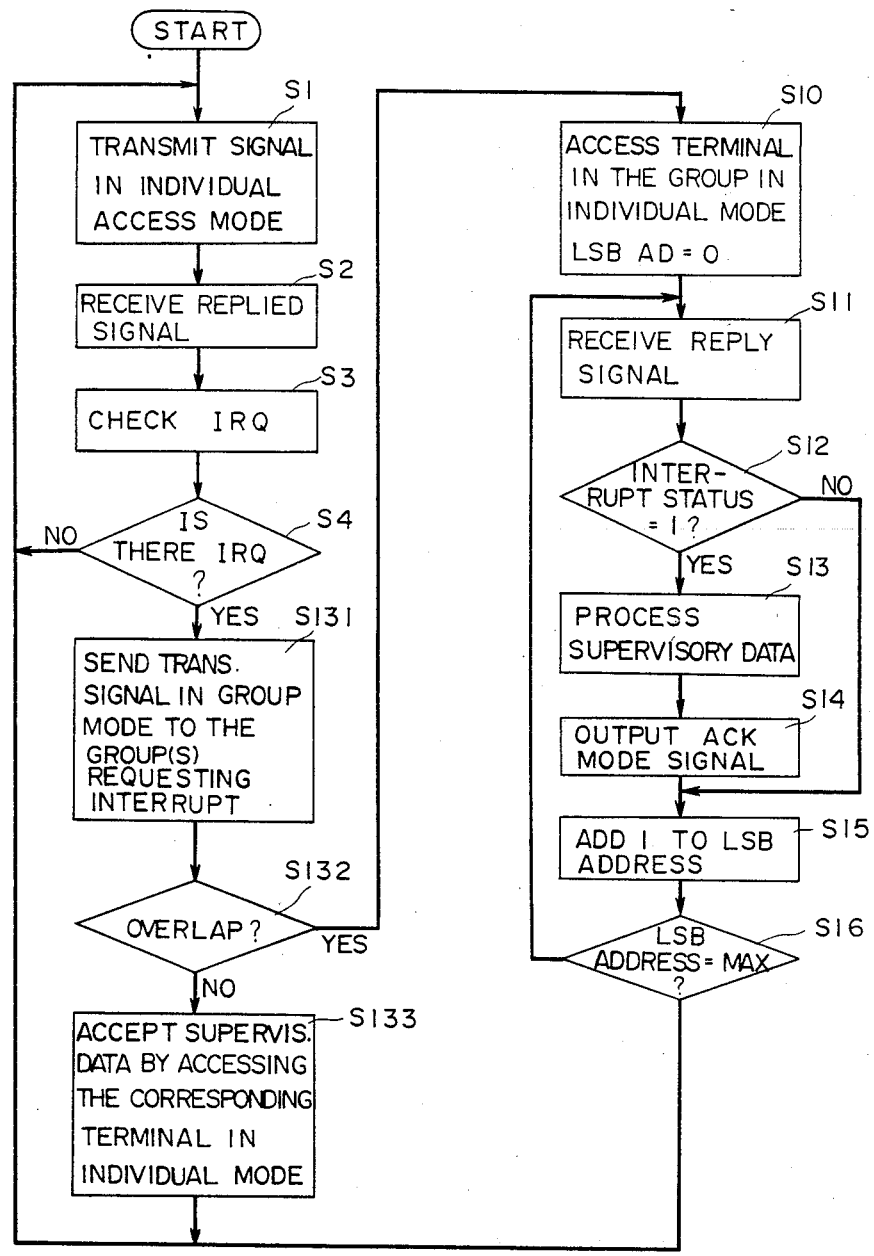
FIG. 13 is a flow chart showing a modification of an operation performed in a central controller.

FIG. 13 shows an operational sequence in a central processor 1 in the case where an interruption request signal is sent out during a predetermined time period as shown in FIG. 12B. Particularly different points from FIG. 10 are as follows. In the step S131, a group or groups which are sending interruption request signals are specified based on the subperiod or subperiods for the interruption request signals sent during an interruption request signal standing-by period, and a transmission signal is transmitted to these groups in a group accessing mode. Thereafter, in the step S132, it is determined whether there is an overlap of address data in the four least significant bits replied as a reply signal. Subsequent operations are the same as the operations subsequent to the step S7 in FIG. 10 and hence the detailed description will be omitted.

As a still further embodiment, it is assumed that it is determined that there is an overrap in the step 7 in FIG. 10. An overlapped position or positions in the four least significant bits of a replied address are detected so that possible addresses can be estimated. For example, in case where the four bits in the least significant address is "00DD" wherein D indicates an overlapped bit position, there are four possible addresses in the four least significant bits, "0000", "0001", "0010" and "0011". In accordance with these 4 possible addresses, corresponding terminals can be accessed in an individual accessing mode.

As described in the foregoing, in accordance with the present invention, if there is an interruption request from a terminal, the terminal can be immediately detected by first using a group accessing mode and then using an individual accessing mode. Thus, in case where a particular terminal is used for the purpose of crime prevention, an emergency situation hardly occurs; however, once such emergency situation occurs, it is necessary to immediately take a necessary step for responding to the emergency situation. The present system according to the present invention is very useful to such a situation. If a system is adapted such that a particular terminal which hardly generates an interruption request signal is not accessed in a normal time, but is accessed only when such interruption request occurs, then an availability of the system can be enhanced.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A time division multiplex remote control system for data transmission between a central controller and addressable remote terminals coupled to the central controller through a signal line, said terminals being divided into groups each group including a predetermined number of terminals, said central controller comprising
transmission signal generating means for generating a transmission signal to be transmitted, said transmission including terminal identifying information for identifying one of said terminals which is to receive said transmission signal to be transmitted, control information indicating a control to be performed in said terminal, and a reply signal standing-by period defining signal for defining a period for receiving a reply signal returned from the terminal identified by said terminal identifying information, said terminal identifying information including group address identifying information identifying a group in which each terminal is included and individual terminal identifying information for identifying individually the terminal included in the group, transmission signal transmitting means for transmitting as the transmission signal group address identifying information as the terminal identifying information generated by said transmission signal generating means, receiving means for receiving a signal sent by said terminals, and control information producing means responsive to the received reply signal for producing necessary control information, each of said plurality of terminals comprising:
store means for storing identifying information identifying the terminal, receiving means for receiving the transmission signal being transmitted from said central controller, control information accepting means responsive to the receiving means for accepting said control information included in said transmission signal when the received terminal identifying information coincides with the identifying information stored in the store means, reply signal transmitting means responsive to the receiving means for transmitting a reply signal in response to the reply signal standing-by period defining signal included in the received transmission signal when the received terminal identifying information coincides with the identifying information stored in the storing means, change-of-supervisory input detecting means for detecting a change of the supervisory input of an object to be controlled which the terminal supervises and producing an output, interruption request signal generating means for generating an interruption request signal in response to the output from the change-of-supervisory input detecting means, and interruption request signal transmitting means for transmitting an interruption request signal generated in the interruption request signal generating means at a timing other than reply signal transmitting timing, and said central controller further comprising:
group accessing mode signal generating means, responsive to the interruption request signal transmitted by the interruption request signal transmitting means of the terminal, for generating a group accessing mode signal for specifying a mode of accessing the terminals by group.

2. A system in accordance with claim 1, wherein
said reply signal transmitting means in the terminal transmits as a reply signal individual identifying information identifying the terminal when the group identifying information received by the terminal coincides with the group identifying information stored in the store means, and said transmission signal transmitting means in the central controller transmits as terminal identifying information the received individual identifying information when the controller receives the individual identifying information as a reply signal.

3. A system in accordance with claim 1, wherein
said transmission signal from the transmission signal transmitting means in the central controller comprises an interruption request signal standing-by period defining signal for defining an interruption request signal standing-by period for receiving the interruption request signal, and said interruption request signal transmitting means transmits the interruption request signal during the standing-by period in response to the interruption request signal standing-by period defining signal from the transmission signal transmitting means.

4. A system in accordance with claim 1, wherein
said interruption request signal standing-by period is divided into a plurality of subperiods corresponding to the groups of the terminals, and said interruption request signal is sent out during the subperiod corresponding to the group identifying information for the group in which the terminal having generated the interruption request signal is included.

5. A system in accordance with claim 2, wherein
said individual identifying information sent out as the reply signal is coded information of a plurality of bits wherein a signal of a single bit is represented as one of a combination of one pulse having a longer pulse width and another pulse having a shorter pulse width and a combination of one pulse having a shorter pulse width and another pulse having a longer pulse width, and said central controller includes combination detecting means for detecting a combination of two pulses having a longer pulse width in each bit of the individual identifying information returned as the reply signal and producing an output.

6. A system in accordance with claim 5, wherein
said transmission signal transmitting means sequentially transmits all of the individual identifying information for the terminals included in said group in response to the detecting output from said combination detecting means.

7. A system in accordance with claim 6, wherein
said reply signal from said terminal comprises information indicating an interruption status in response to said interruption request signal generated by the terminal.

8. A system in accordance with claim 5, wherein said central controller includes possible address evaluating means responsive to the detecting output from said combination detecting means for detecting the bit position or positions where such combination or combinations are detected so that possible addresses can be estimated, and said transmission signal transmitting means sequentially transmits said estimated possible addresses as individual identifying information.

* * * * *

UNITED STATES PATENT AND TRADEMARK OFFICE
CERTIFICATE OF CORRECTION

PATENT NO. : 4,586,040

DATED : April 29, 1986

INVENTOR(S) : Osamu Akiba et al.

It is certified that error appears in the above-identified patent and that said Letters Patent is hereby corrected as shown below:

IN THE DRAWINGS:

Fig. 7, at the top, "57" should be --56--;
on the left side, "G1" should be --61--.

Column 3, line 66, delete "which";
line 67, after "to" insert --which.

Column 4, line 30, "Other" should be --Another--.

Column 6, line 5, "a" should be --an--;
line 39, "a" should be --an--.

Column 9, line 37, "an" should be --a--.

Column 12, line 56, "address" should be --addresses--;
line 59, after "in" (first occurrence)
insert --the--.

Column 13, line 44, "a" should be --an--.

UNITED STATES PATENT AND TRADEMARK OFFICE
CERTIFICATE OF CORRECTION

PATENT NO. : 4,586,040                          Page 2 of 2

DATED : April 29, 1986

INVENTOR(S) : Osamu Akiba et al.

It is certified that error appears in the above-identified patent and that said Letters Patent is hereby corrected as shown below:

```
Column 14, line 14, "An" should be --A--;
           line 42, "overrap" should be --overlap--.

Column 15, line 17, after "transmission" insert --signal--.

Column 16, line 4, after "than" insert --said--.
```

Signed and Sealed this

Twenty-first Day of October, 1986

[SEAL]

*Attest:*

DONALD J. QUIGG

*Attesting Officer*            *Commissioner of Patents and Trademarks*